United States Patent
Al Ghossein

(10) Patent No.: US 11,320,616 B2
(45) Date of Patent: May 3, 2022

(54) UTILITY ENCLOSURES WITH CABLE STORAGE SYSTEMS

(71) Applicant: Hubbell Incorporated, Shelton, CT (US)

(72) Inventor: Rabih M. Al Ghossein, Hoover, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/424,064

(22) Filed: May 28, 2019

(65) Prior Publication Data

US 2019/0369349 A1 Dec. 5, 2019

Related U.S. Application Data

(60) Provisional application No. 62/678,767, filed on May 31, 2018.

(51) Int. Cl.
G02B 6/44 (2006.01)
H02G 3/00 (2006.01)

(52) U.S. Cl.
CPC ......... *G02B 6/4451* (2013.01); *G02B 6/4457* (2013.01); *G02B 6/4478* (2013.01); *H02G 3/263* (2013.01)

(58) Field of Classification Search
CPC ........................................................ G02B 6/44
See application file for complete search history.

(56) References Cited

U.S. PATENT DOCUMENTS

| | | | |
|---|---|---|---|
| 4,697,874 A | 10/1987 | Nozick | |
| 5,335,874 A | 8/1994 | Shrum et al. | |
| 6,322,019 B1 | 11/2001 | Talamini, Sr. | |
| 6,347,760 B1 | 2/2002 | Talamini, Sr. | |
| 6,625,374 B2 | 9/2003 | Holman | |
| 6,814,328 B1* | 11/2004 | Li | G02B 6/4457 242/400.1 |
| 7,059,895 B2* | 6/2006 | Murano | H02G 3/123 385/135 |
| 7,302,155 B2* | 11/2007 | Weinert | G02B 6/4457 385/135 |
| 8,444,078 B1 | 5/2013 | Brown et al. | |

(Continued)

FOREIGN PATENT DOCUMENTS

MX 43658 3/2015

OTHER PUBLICATIONS

Hubbell Incorporated, "ADSS Communication Hardware", Brochure, Mar. 2016, pp. 4-6, USA.
(Continued)

*Primary Examiner* — Tina M Wong
(74) *Attorney, Agent, or Firm* — Wissing Miller LLP

(57) ABSTRACT

The present disclosure relates to a utility enclosure that can store fiber optic cables that includes an underground enclosure and a cable storage system mountable to a wall of the enclosure. The cable storage system includes a cable storage wheel for storing the fiber optic cable, a mounting plate used to secure the cable storage wheel to the wall of the enclosure, and a spacer. The spacer has a first end secured to the mounting plate and a second end secured to the cable storage wheel for maintaining the cable storage wheel in a spaced relationship relative to the wall of the enclosure.

14 Claims, 15 Drawing Sheets

(56) References Cited

U.S. PATENT DOCUMENTS

| | | | |
|---|---|---|---|
| 8,750,668 B2* | 6/2014 | Chu | G02B 6/4457 385/135 |
| 9,042,700 B2* | 5/2015 | Smith | B65H 75/146 385/135 |
| 9,891,399 B2* | 2/2018 | Krampotich | B65H 49/28 |
| 10,197,757 B2 | 2/2019 | Herrington et al. | |
| 10,359,590 B2* | 7/2019 | Haile-Mariam | G02B 6/4457 |
| 2002/0131749 A1* | 9/2002 | Swenson | G02B 6/4453 385/135 |
| 2002/0172489 A1 | 11/2002 | Daoud et al. | |
| 2003/0190134 A1* | 10/2003 | Tsai | H01S 3/06704 385/135 |
| 2004/0218886 A1* | 11/2004 | Brown | B65H 75/14 385/135 |
| 2004/0232275 A1* | 11/2004 | Vogel | H02G 11/02 242/614 |
| 2004/0240825 A1* | 12/2004 | Daoud | G02B 6/4454 385/135 |
| 2005/0145522 A1 | 7/2005 | Bloodworth et al. | |
| 2006/0045458 A1* | 3/2006 | Sasaki | G02B 6/444 385/135 |
| 2007/0274659 A1* | 11/2007 | Kaplan | G02B 6/4441 385/134 |
| 2008/0170831 A1* | 7/2008 | Hendrickson | G02B 6/4441 385/135 |
| 2008/0292261 A1* | 11/2008 | Kowalczyk | G02B 6/3897 385/135 |
| 2008/0296426 A1 | 12/2008 | Cairns et al. | |
| 2009/0152390 A1* | 6/2009 | Underbrink | B65H 49/24 242/432.6 |
| 2009/0230228 A1* | 9/2009 | Penumatcha | G02B 6/4457 242/395 |
| 2009/0317047 A1 | 12/2009 | Smith et al. | |
| 2010/0054680 A1* | 3/2010 | Lochkovic | B65H 75/14 385/135 |
| 2012/0145821 A1 | 6/2012 | Penumatcha et al. | |
| 2012/0294580 A1 | 11/2012 | Burek et al. | |
| 2013/0075522 A1 | 3/2013 | Penumatcha | |
| 2013/0195417 A1* | 8/2013 | Torman | G02B 6/4457 385/135 |
| 2013/0200193 A1* | 8/2013 | Lichoulas | B65H 75/12 242/118.3 |
| 2013/0209049 A1* | 8/2013 | Kowalczyk | G02B 6/4457 385/135 |
| 2013/0259438 A1* | 10/2013 | Chu | G02B 6/4439 385/135 |
| 2014/0161411 A1* | 6/2014 | Slater | G02B 6/4471 385/135 |
| 2015/0043882 A1* | 2/2015 | Schomisch | G02B 6/3897 385/135 |
| 2015/0063770 A1* | 3/2015 | Kowalczyk | G02B 6/4446 385/135 |
| 2015/0093088 A1* | 4/2015 | Matz | G02B 6/4446 385/135 |
| 2016/0109675 A1* | 4/2016 | Ott | G02B 6/4457 385/135 |
| 2016/0334596 A1* | 11/2016 | Herrington | G02B 6/4457 |

OTHER PUBLICATIONS

Hubbell Incorporated, Opti Loop FOS, "ADSS Direct Attach Fiber Optic Storage System" 1 page, 2014.

Hubbell Incorporated, Opti Loop FOS, Aluminum Fiber Optic Storage System 1 page, 2014.

* cited by examiner

FIG. 11
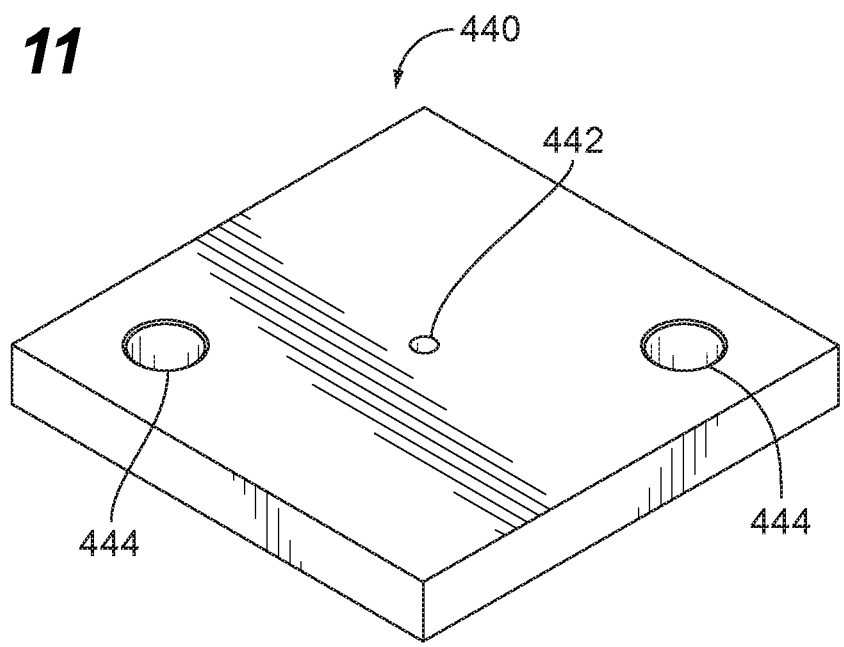
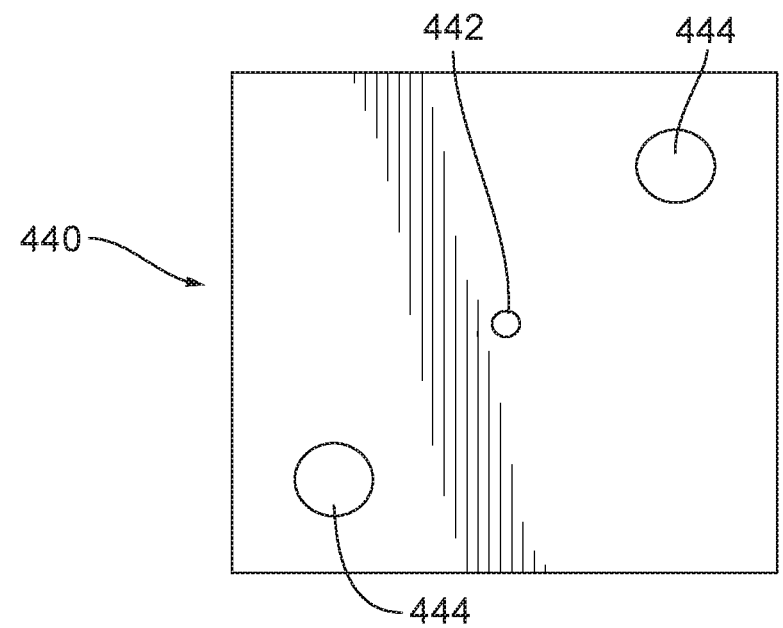
FIG. 12

UTILITY ENCLOSURES WITH CABLE STORAGE SYSTEMS

CROSS REFERENCE TO RELATED APPLICATIONS

The present disclosure is based on and claims benefit from U.S. Provisional Patent Application Ser. No. 62/678,767 filed on May 31, 2018 entitled "Utility Enclosures with Cable Storage Systems" the contents of which are incorporated herein in their entirety by reference.

BACKGROUND

Field

The present disclosure relates generally to utility enclosures. More particularly, the present disclosure relates to utility enclosures with cable storage systems, underground utility enclosures with cable storage systems, and utility enclosures with fiber optic cable storage systems.

Description of the Related Art

Telecommunication infrastructure includes systems for mounting fiber optic cabling for communication, data or media transmission to utility poles or structures in so called aerial deployments. Systems are also available allowing fiber optic cables to be run and/or terminated, spliced, etc. in below grade or underground structures. When run underground, the cable may be armored and/or be installed within a conduit and terminated in an enclosure, box or vault.

One limitation of fiber optic cables in general is that they are known to have minimum bending radius limitations. Unfortunately, violations of such minimum bending radius limitations during storage, installation, and/or use can damage such cables. In underground enclosures, technicians often lay excess fiber optic cabling in the bottom of the enclosure such that the fiber optic cabling is stored in a hap-hazard manner where the glass fibers inside the fiber optic cabling are at risk of being damaged.

For cost, ease and convenience reasons, it would be desirable to safely and efficiently store extra or excess cable, e.g., fiber optic cable, in a safe manner and in a secure environment so that the cabling is not exposed to the of the elements.

SUMMARY

The present disclosure provides exemplary embodiments of utility enclosures, boxes and vaults with cable storage systems. In one exemplary embodiment, a utility enclosure that can store fiber optic cable is provided. The utility enclosure includes an underground enclosure and a cable storage system. The cable storage system is mountable to a wall of the enclosure and includes at least one cable storage member for storing the fiber optic cable, at least one mounting plate and at least one spacer. The at least one cable storage member may be a cable storage wheel. The at least one mounting plate is used to secure the at least one cable storage member to the wall of the enclosure, and the at least one spacer has a first end secured to the mounting plate and a second end secured to the at least one cable storage member for maintaining the at least one cable storage member in a spaced relationship relative to the wall of the enclosure.

In another exemplary embodiment, the present disclosure provides an underground cable storage utility enclosure. The underground cable storage utility enclosure includes an enclosure, a plurality of circular cable storing members secured to a wall of the enclosure for holding fiber optic cable, and a plurality of spacers for maintaining each of the plurality of circular cable storing members in a spaced relationship with respect to each other and the wall of the enclosure.

The present disclosure also provides embodiments of cable storage system for storing fiber optic cables in an underground enclosure. The cable storage system includes a plurality of cable storage members for holding a plurality of fiber optic cables and at least one spacer provided between adjacent cable storage members. Each of the plurality of cable storage members is configured to hold one of the plurality of fiber optic cables without violating a minimum bending radius threshold of that fiber optic cable. The at least one spacer is provided to maintain the cable storage members in a stacked spaced relationship.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 11 is a top perspective view of an exemplary embodiment of a mounting plate according to the present disclosure;

FIG. 12 is a top plan view of the mounting plate of FIG. 11;

DETAILED DESCRIPTION

Figure 1:
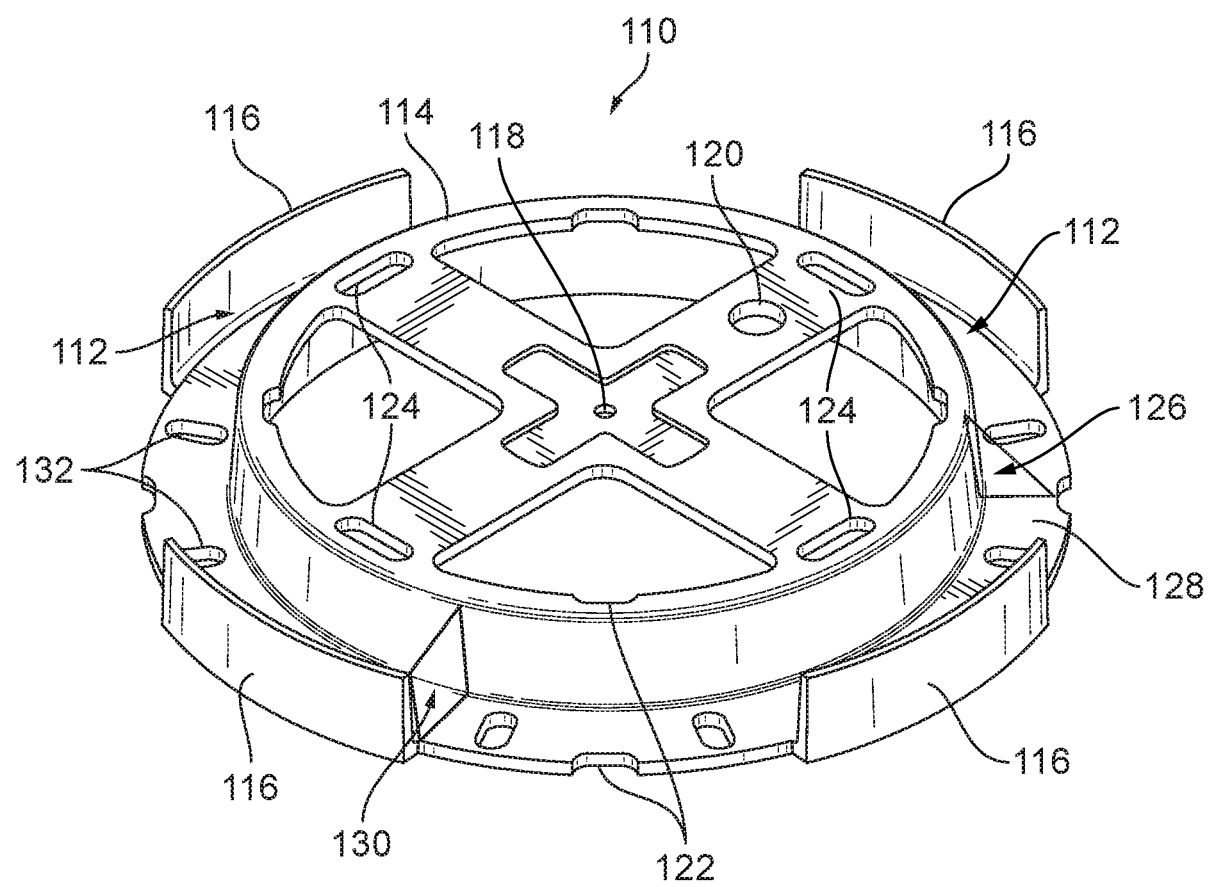
FIG. 1 is a top perspective view of a cable storage wheel according to an exemplary embodiment of the present disclosure.
Figure 2:
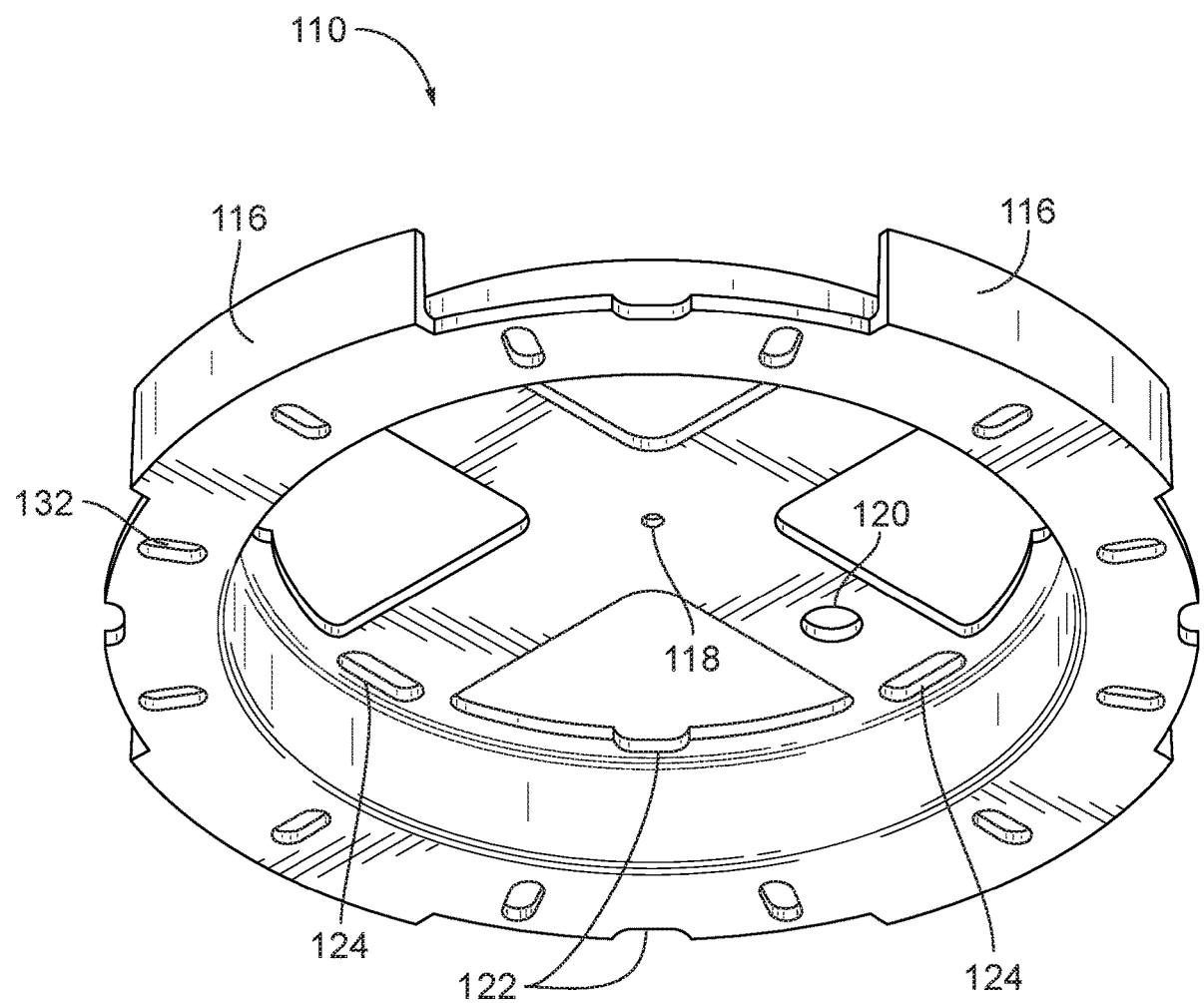
FIG. 2 is a bottom perspective view of the cable storage wheel of FIG. 1.
Figure 3:
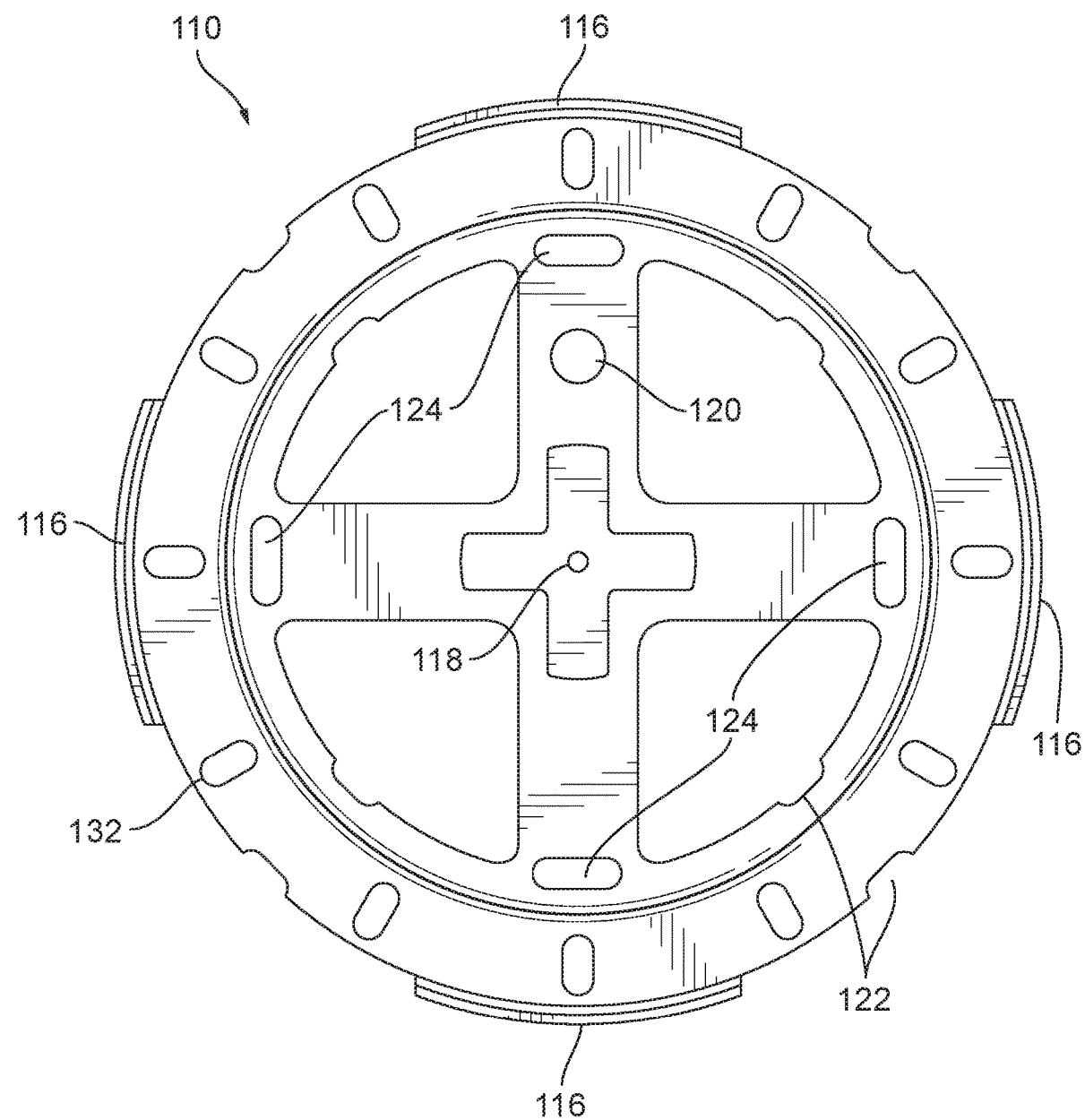
FIG. 3 is a top plan view of the cable storage wheel of FIG. 1.
Figure 4:
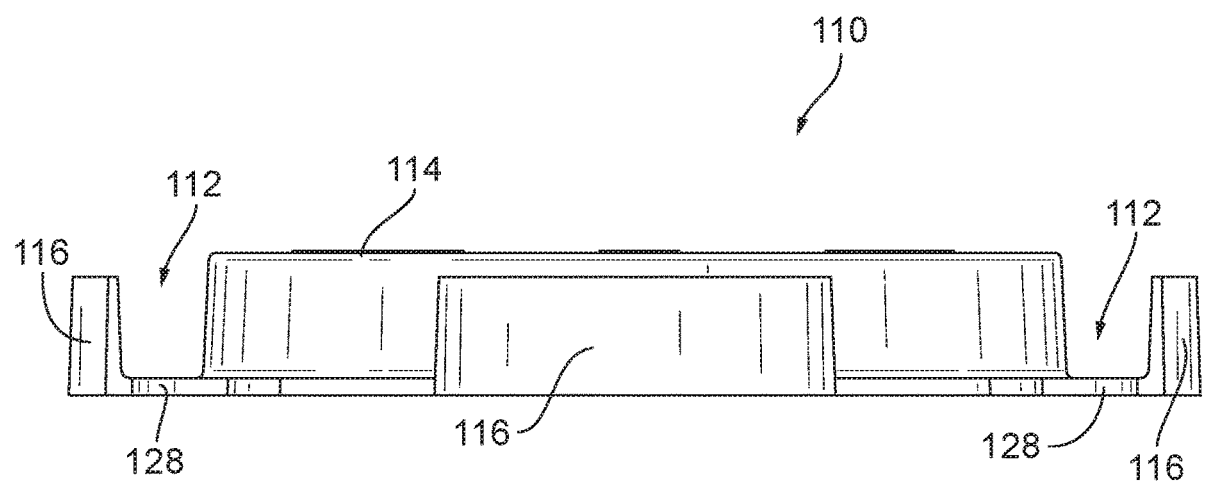
FIG. 4 is a side elevation view of the cable storage wheel of FIG. 1.

Exemplary embodiments of utility enclosures, boxes and vaults with cable storage systems are shown and described. The utility enclosures, boxes and vaults can be above ground utility enclosures, boxes and vaults, or the utility enclosures can be underground enclosures, boxes and vaults. The cable storage systems may be a single cable storage member assembly or multiple cable storage member assemblies stacked in a side-by-side relationship. According to an exemplary embodiment of the present disclosure, the one or more cable storage members may be mounted to an interior of a utility enclosure, such as the interior of an underground utility enclosure, which may house utility equipment or components, such as communication cables including fiber optic cables, terminations, junctions, etc.

The cable storage member assembly according to the present disclosure includes a cable storage member and the components used to secure the cable storage member in the enclosure. The cable storage member according to an exemplary embodiment of the present disclosure is a cable storage wheel. An exemplary embodiment of a cable storage wheel 110 according to the present disclosure is shown in FIGS. 1-4. The wheel 110 is specifically designed for storing and protecting lengths and splice points for communication cables, such as fiber optic cables, including main span and mid span fiber optic cables. Non-limiting examples of fiber optic cables include ADSS cables, RPX cables, LT cables, SST cables, ROC cables and Figure-8 Cables.

For ease of description, the utility enclosures contemplated by the present disclosure may also be referred to as the "enclosure" in the singular and the "enclosures" in the plural. In addition, the cable storage wheel assembly may also be referred to as the "wheel assembly" in the singular and the "wheel assemblies" in the plural. The cable storage wheels may also be referred to as the "wheel" in the singular and the "wheels" in the plural. Lastly, the communication cable may also be referred to as the "cable" in the singular and the "cables" in the plural.

The cable storage wheel 110 is configured and designed to protect the bend radius of cables during storage while allowing the cables to rest in a cable holding channel 112. In addition, the cable storage wheel 110 is configured and designed to allow the use of cable fasteners, such as cable or wire ties, to maintain the cable within the cable holding channel 112 while minimizing or eliminating contact between the cable fastener and the cable. For example, the cable storage wheel 110 may include strategically placed features allowing cable fasteners to be used to maintain the cable on the cable storage wheel 110 while having minimum contact with the cable. Such features can include, but are not limited to slots, notches, openings, channel supports, and combinations thereof.

The cable holding channel 112 is defined by a hub 114, one or more outer rims 116 and a floor 128. For ease of description, the cable holding channel 112 may also be referred to as the channel. The channel 112 is configured to receive and store one or more coils of cable (not shown) at a radius above the permitted minimum bending radius of the cable. The permitted minimum bending radius of the cable is the radius a cable may be bent before the transmission properties of the cable degrade below a permitted threshold. The cable storage wheel 110 according to the present disclosure allows a minimum bending radius of about 20 times the outside diameter of the cable allowing secure storage for the cables and its fibers. As a non-limiting example, the channel 112 of the wheel 110 is about 1.6" wide, with an outside diameter of about 15" and an inside diameter of about 11.8." Although the wheel 110 illustrated in FIGS. 1-4 has four, equally spaced rims 116 having a common radial length, it will be appreciated that the wheel 110 may have any desired number of rims 116, any desired rim spacing whether equal or un-equal, and any common or different radial length sufficient to form the channel 112. In another exemplary embodiment, the wheel 110 may have a single continuous rim 116.

Although illustrated as circular, it will be appreciated that the channel 112, hub 114 and/or rim 116 may have any suitable geometric configuration that allows cable to be stored in the channel 112 without violating the minimum bending radius threshold of the cable stored therein.

Figure 5:
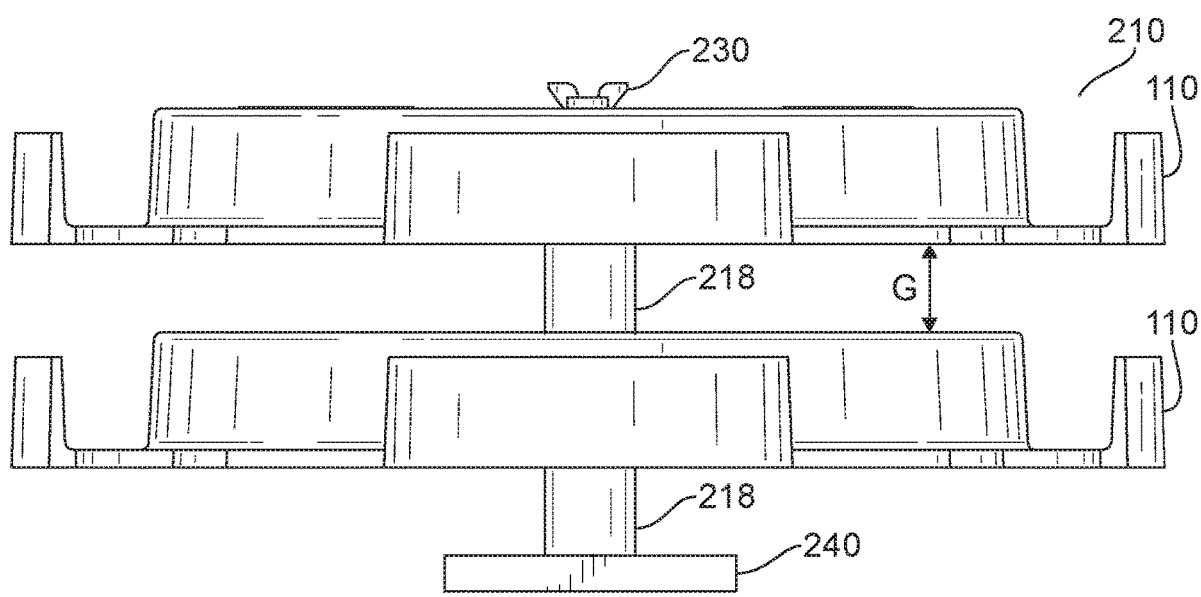
FIG. 5 is a side elevation view of stacked cable storage wheels according to an exemplary embodiment of the present disclosure.
Figure 17:
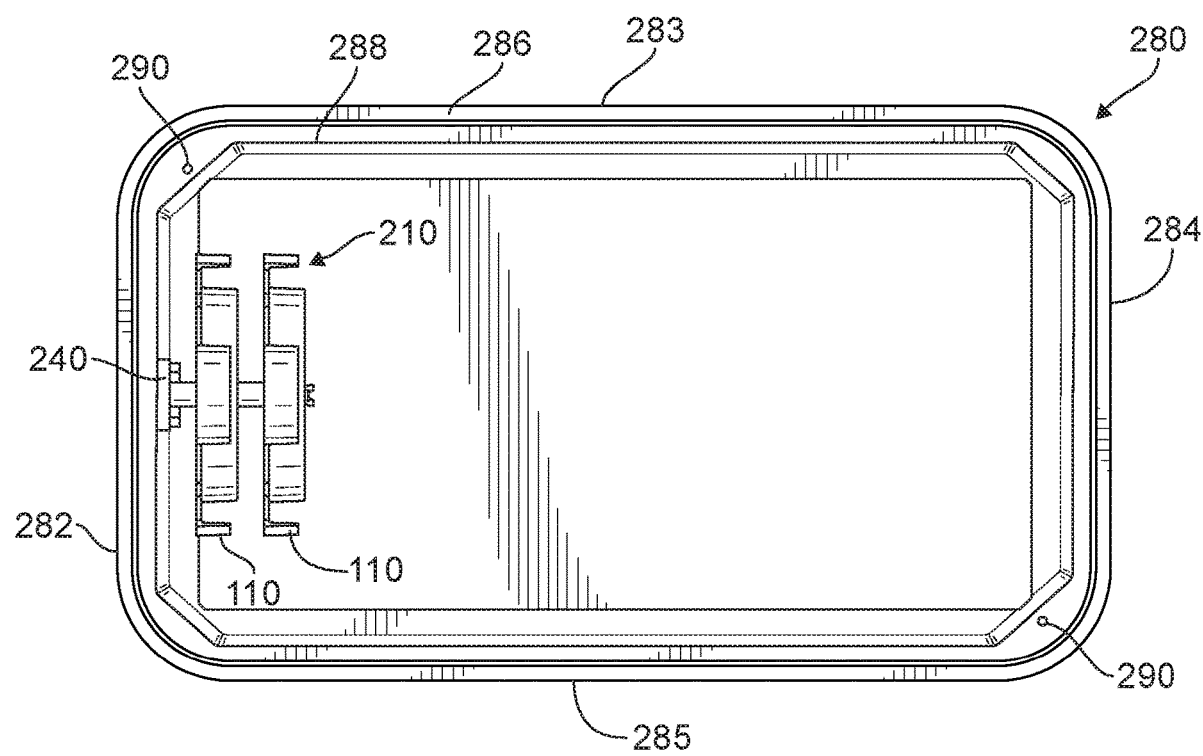
FIG. 17 is a top plan view of an exemplary embodiment of a storage enclosure for storing one or more cable storage wheels according to the present disclosure.

In the exemplary embodiment of FIGS. 1-4, the wheel 110 includes an opening 118 configured to receive a standoff, e.g., standoff 218 seen in FIG. 5, that allows the wheel 110 to be secured to a wall of an enclosure 280 as seen in FIG. 17, or that allows multiple wheels 110 to be stacked in a spaced relationship and mounted within the enclosure 280, as will be described below. The wheel 110 may also include one or more pairs of mounting structures or features used to mount cable fasteners, such as cable or wire ties (not shown) to the wheel 110. In the exemplary embodiment shown, the mounting structures may include notches 122 formed in the hub 114 and floor 128 of the channel 112. The notches 122 are configured to receive a cable fastener to secure the cable within the channel 112 without crimping or compressing the cable. In the embodiment shown, the use of cable fasteners with the notches 122 provides a triangular shaped storage area 126, seen in FIG. 1, that is bounded by the hub 114 and floor 128 of the channel 112 and the cable fastener, e.g., the cable or wire tie. In another exemplary embodiment, the mounting structures may include slots. For example, in the embodiment of FIGS. 1-4, the hub 114 may include one or more slots 124 that oppose the rims 116. In this exemplary embodiment, the use of cable fasteners with slots 124 provide a rectangular shaped storage area 130, namely a storage area bounded by the rim 116, the floor 128 of channel 112, the hub 114 and the wire tie. As another example, the floor 128 may include one or more slots 132 through which cable fasteners may be passed to secure the cable to the wheel 110. The slots 124 and 132 and the orifice 120 may also be utilized for attaching the wheel 110 to the enclosure 280.

The wheel 110 can be formed of any material having sufficient rigidity and strength to support the cable in the desired deployment. For example, the wheel 110 can be formed of metal, plastic and/or polymer materials. The wheel 110 can be formed as a unitary, monolithic one-piece member or can be formed of multiple components that are secured to one another in any desired manner.

Figure 6:
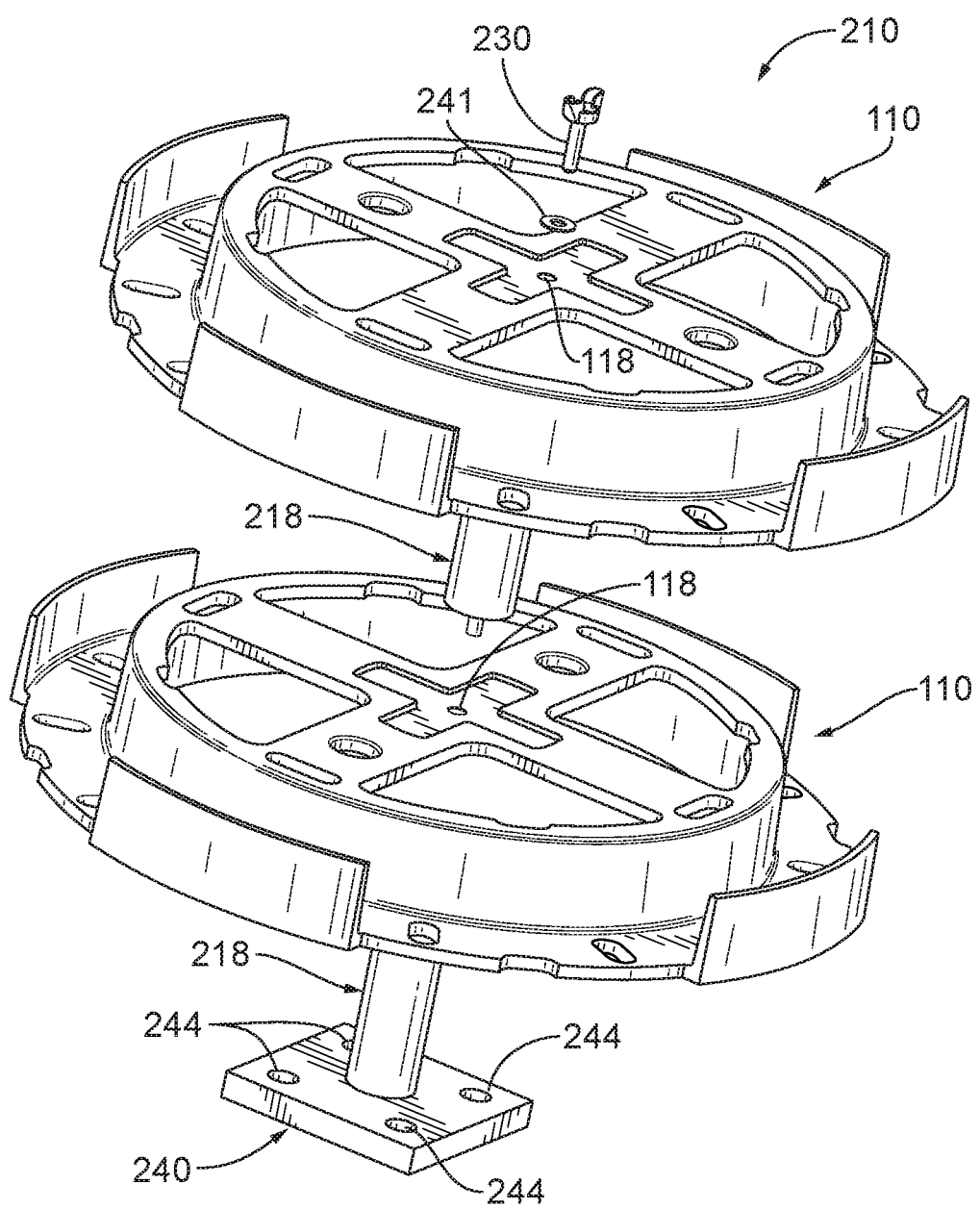
FIG. 6 is an exploded side perspective view of the stacked cable storage wheels of FIG. 5.
Figure 7:
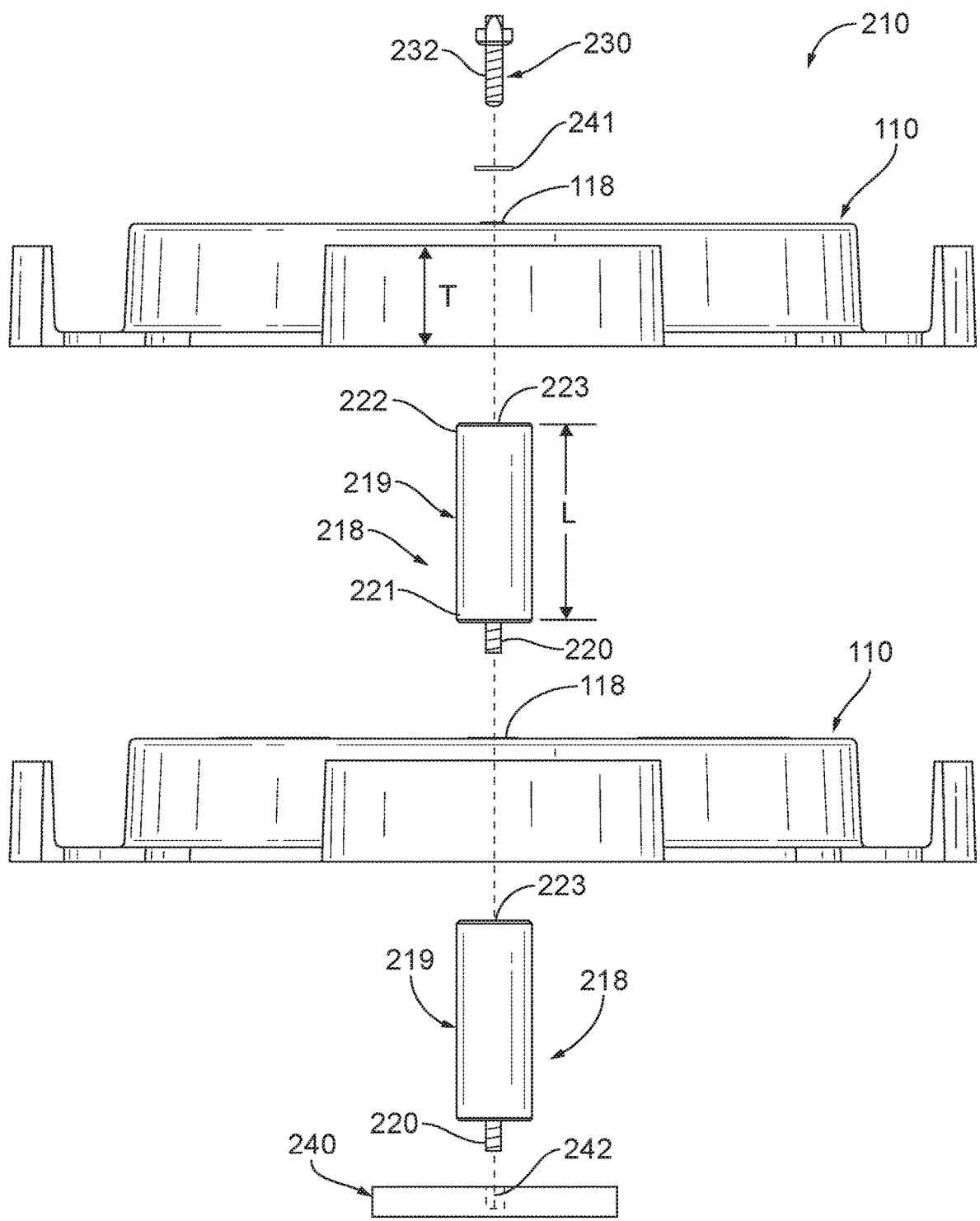
FIG. 7 is an exploded side elevation view of the stacked cable storage wheels of FIG. 5.

As noted above, stacked cable storage wheels 210 may include multiple wheels 110 that can be stacked together to support multiple cables. In the exemplary embodiment of FIGS. 5-7, multiple cable storage wheels 110 may be stacked such that there is a gap "G" (seen in FIG. 5) between the wheels 110 allowing easy access to the cable stored on each of the wheels 110. In the embodiment of FIGS. 5-7, two wheels 110 are stacked. However, one skilled in the art would readily appreciate that more than two wheels 110 may be stacked. A group of two or more wheels stacked together are referred to herein generally as stacked wheels 210.

Figure 8:
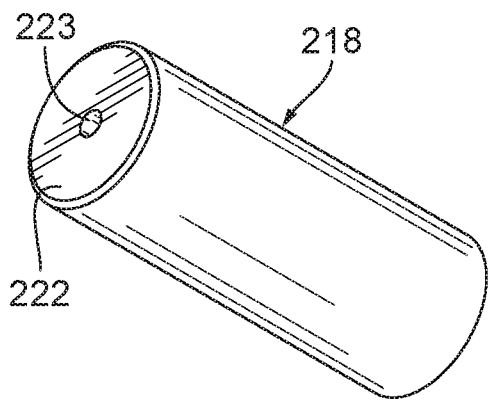
FIG. 8 is a perspective view of a standoff according to an exemplary embodiment of the present disclosure.
Figure 9:
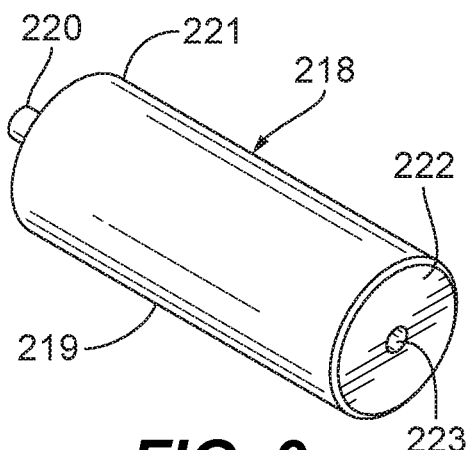
FIG. 9 is another perspective view of the standoff of FIG. 8.
Figure 10:
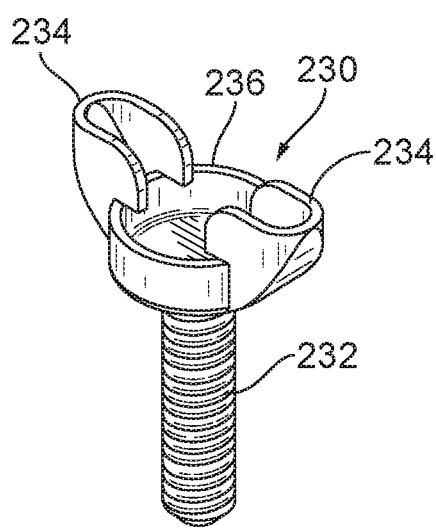
FIG. 10 is a perspective view of a wing bolt according to an exemplary embodiment of the present disclosure.

Preferably, when stacking the wheels 110, the wheels 110 are stacked so that there is a gap "G" between the wheels 110 that provides easy access to the cable on each of the wheels 110 without the need of removing the wheels 110 from the stacked wheels 210. The gap "G" may be created by positioning one or more standoffs 218 between adjacent wheels 110 as shown. Referring to FIGS. 7-9, each standoff 218 includes a body 219 having a first end 221 and a second end 222. The body has a length "L," seen in FIG. 7, which is generally equal to or greater than an inner thickness "T" of the wheel 110. The first end 221 of the body 219 includes a stud 220 extending therefrom, and the second end 222 of the body 219 includes a hole 223, seen in FIGS. 8 and 9, for receiving the stud 220. The stud 220 may be a threaded stud or a smooth stud 220. Similarly, the hole 223 may be a threaded hole or a smooth bore hole 223 configured to match the type of stud 220. The stud 220 is also dimensioned to pass through an orifice 118 in the wheel 110 and into the hole 223 of another standoff 218. Depending on the particular gap "G" desired, two or more standoffs 218 may be joined together using threaded studs and screwing the threaded stud 220 of one standoff 218 into the threaded hole 223 of another standoff 218. Of course, the length "L" of body 219 of the standoff 218 may be made in various lengths as desired and suitable for differently configured cable storage wheels 110. Although the body 219 is shown in FIGS. 8 and 9 as circular in cross-section, it will be appreciated that body 219 may assume any geometric cross-section as suitable for a particular application. To secure the outermost wheel 110 in the stacked wheels 210, a wing bolt 230 may be used. The wing bolt 230 in this exemplary embodiment has a threaded end 232 dimensioned to pass through a washer 241 and the orifice 118 in the wheel 110 and to be screwed into a threaded hole 223 in the outermost a standoff 218. As shown in more detail in FIG. 10, the threaded end 232 extends from base section 236 of wing bolt 230, and winged ends 234 extend from a base section 236 of the wing bolt 230 allowing the wing bolt 230 to be easily manipulated by hand.

Figure 13:
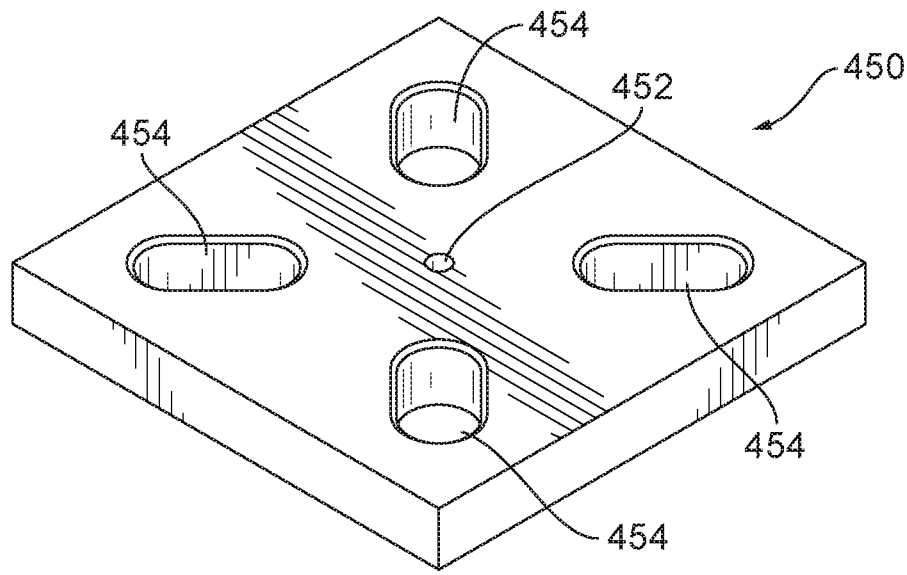
FIG. 13 is a top perspective view of another exemplary embodiment of a mounting plate according to the present disclosure.
Figure 14:
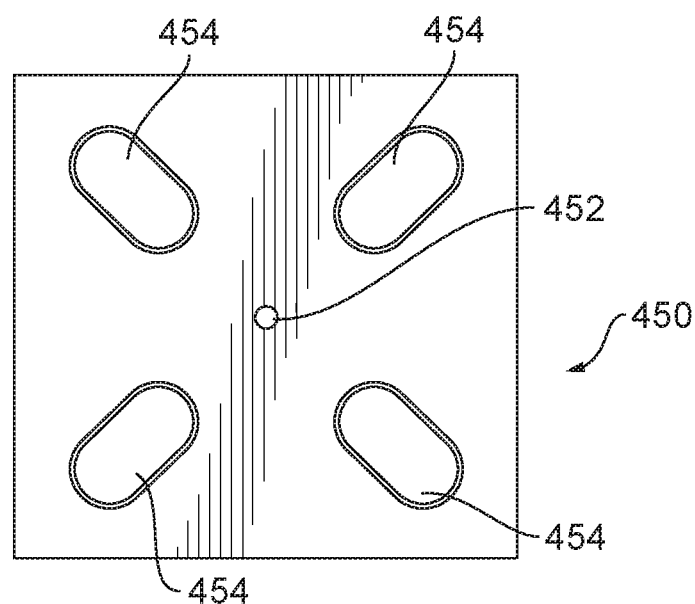
FIG. 14 is a top plan view of the mounting plate of FIG. 13.
Figure 15:
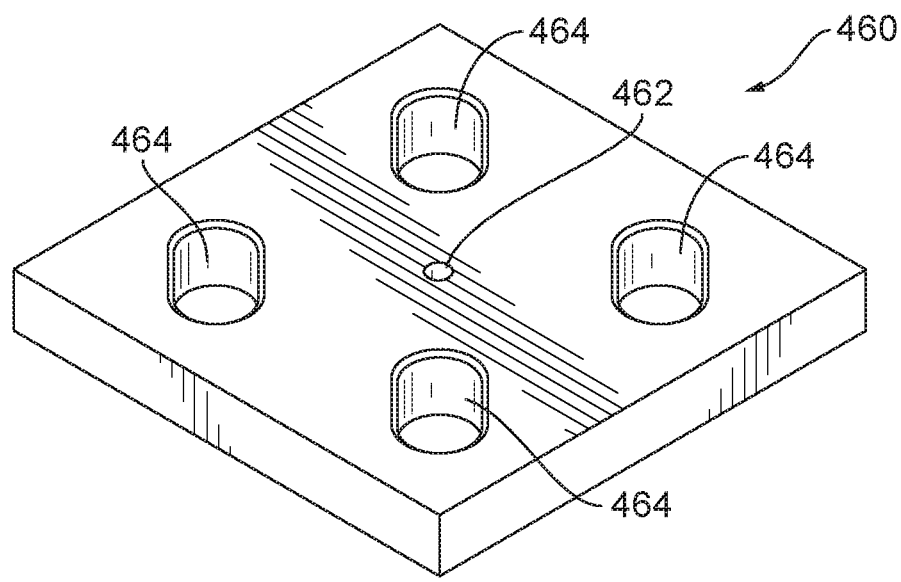
FIG. 15 is a top perspective view of another exemplary embodiment of a mounting plate according to the present disclosure.
Figure 16:
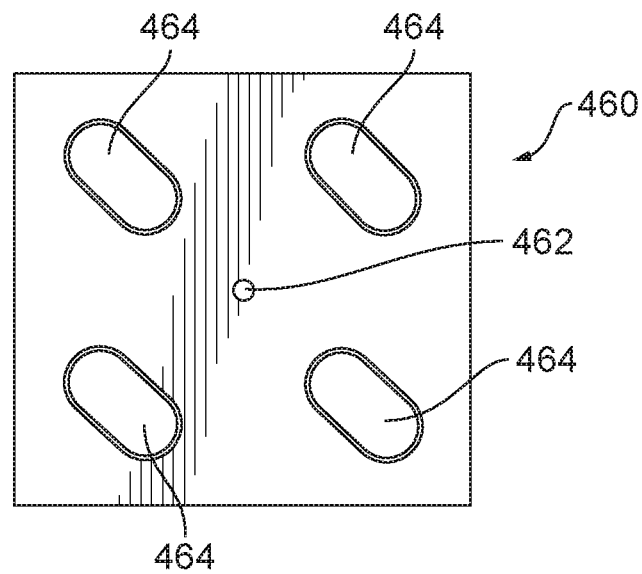
FIG. 16 is a top plan view of the mounting plate of FIG. 15.
Figure 18:
FIG. 18 is a side elevation view of an exemplary embodiment of a cover of the storage enclosure of FIG. 17.

Exemplary embodiments of a mounting plate used to secure a wheel 110 or stacked wheels 210 of the present disclosure to an interior of an enclosure 280. In the embodiment of FIGS. 5-7, the mounting plate 240 is substantially square in shape and includes a threaded orifice 242, seen in FIG. 7, that is dimensioned for receiving the threaded stud 220 of the inner most standoff 218. The mounting plate 240 also includes four mounting holes 244 through which bolts can be passed allowing the mounting plate 240 to be bolted to the enclosure 280. The mounting plate 240 may be provided in a myriad of other shapes and configurations, including but not limited to those shown in FIGS. 11-16. For example, as shown in FIGS. 11 and 12, the mounting plate 440 includes a threaded orifice 442 dimensioned for receiving threaded stud 220 of a standoff 218, and two mounting holes 444 used for receiving bolts for securing the mounting plate 440 to an enclosure. As shown in FIGS. 13 and 14, the mounting plate 450 includes a plurality of elongated mounting holes 454 which extend from corner edges of the mounting plate 450 toward the threaded orifice 452 which is provided in the center of the plate 450 and is dimensioned for receiving threaded stud 220 of a standoff 218. It is noted, that the elongated mounting holes 454 in the mounting plate 450 may be arranged in any desired configuration. For example, as shown in FIGS. 15 and 16, the mounting plate 460 includes a threaded orifice 462 dimensioned for receiving the threaded stud 220 of a standoff 218, and a plurality of elongated mounting holes 464 each extending in the same angular direction. The elongated mounting holes 464 depicted in FIGS. 11-16 allow one or more mounting plate to be adjusted prior to tightening the nuts and bolts securing the one or more mounting plates to the enclosure. Although depicted as substantially square in shape, the mounting plates 440, 450 and 460 may be provided in any suitable shape including but not limited to rectangular, triangular, round, oblong, etc.

As noted above, a single wheel 110 may be secured within in an enclosure 280 or a stacked wheel 210 may be secured within an enclosure 280. In addition, each wheel 110 is configured to store a cable without violating the minimum bending radius threshold of the cable stored by the wheel 110. Referring now to FIGS. 17-21, an exemplary embodiment of a stacked wheel 210 secured within an enclosure 280 is shown. The enclosure 280 may be provided above or below grade depending on a particular application. The enclosure 280 includes four side walls 282-285. At least one of the side walls 282, 283, 284 and 285 includes a plurality of mounting holes 361, seen in FIG. 12, configured to correspond to, for example, the mounting holes 244 in the mounting plate 240, seen in FIG. 6, so that mounting bolts can affix the mounting plate 240 to a wall of the enclosure 280. For example, as shown in FIG. 20, the mounting plate 240 is mounted to side wall 282 of the enclosure 280 utilizing nuts 344 and bolts 342. Depending on a particular application, an additional mounting plate 240A may be provided outside the enclosure 280 providing additional reinforcement.

Figure 19:
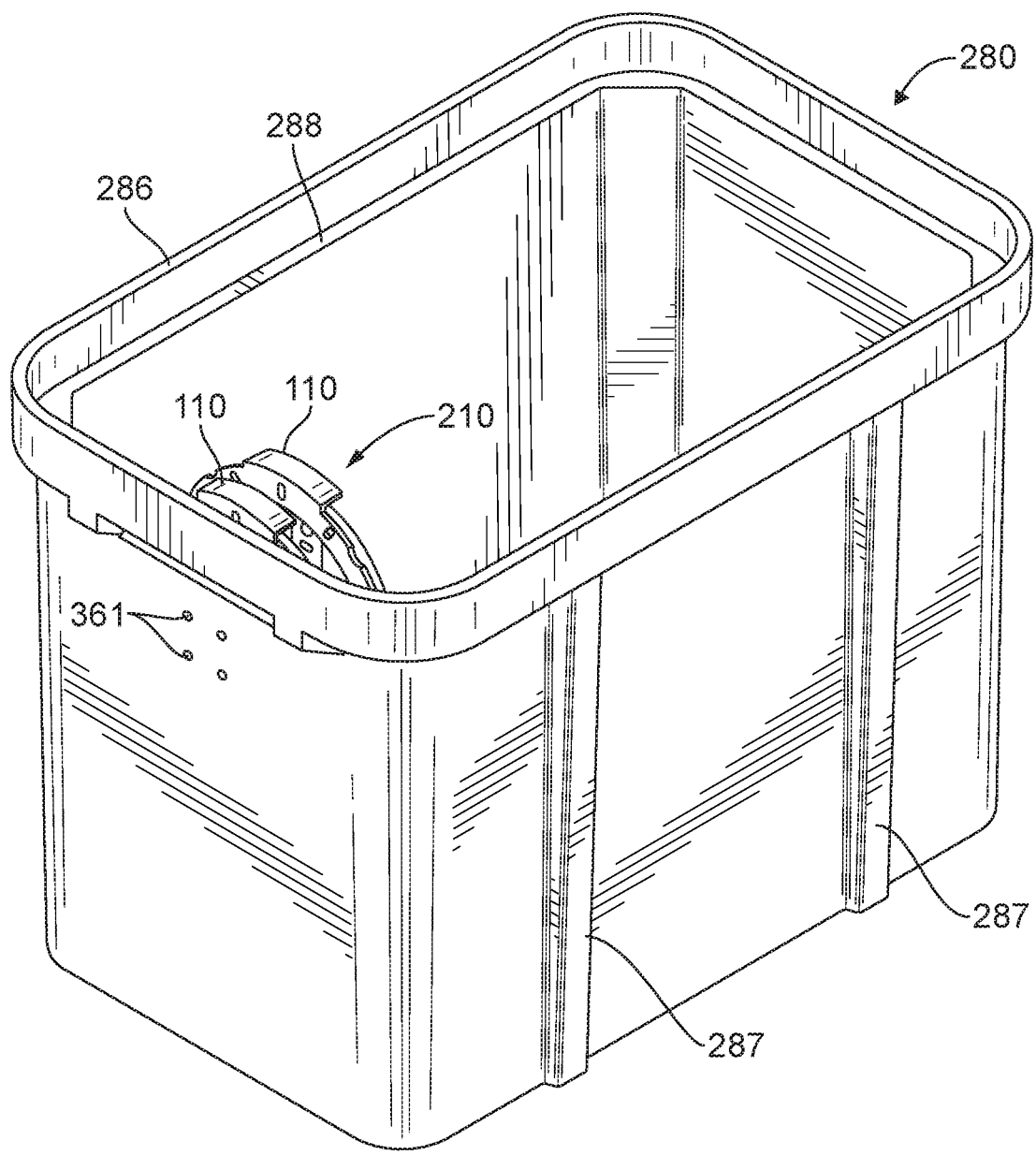
FIG. 19 is a top side perspective view of the storage enclosure of FIG. 17.
Figure 20:
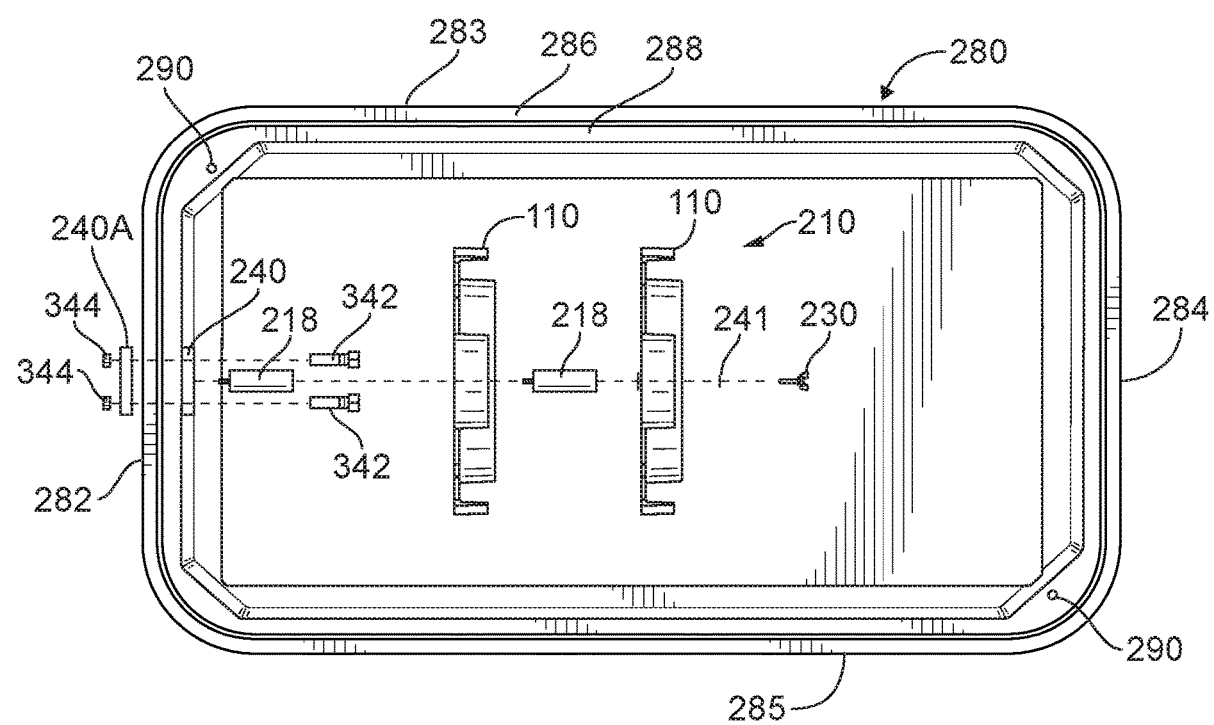
FIG. 20 is an exploded top plan view of the storage enclosure of FIG. 17.
Figure 21:
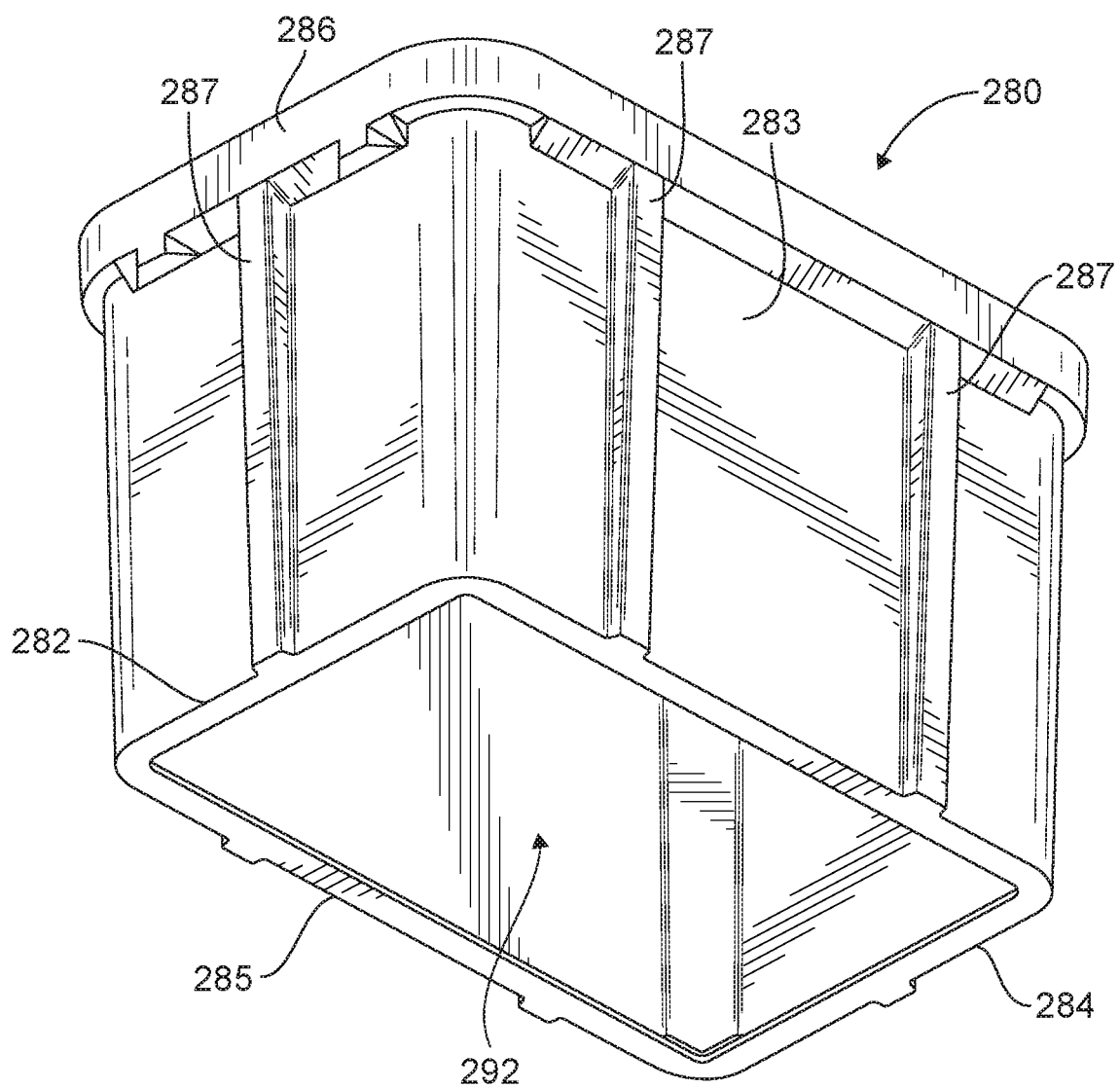
FIG. 21 is a bottom perspective view of the storage enclosure of FIG. 17.

The exemplary enclosure 280 shown in FIGS. 17-21 is in the form of a rectangular utility box. However, the enclosure 280 may be in any suitable shape as desired including but not limited to square, triangular, round, octagonal, etc. The side walls 282-285 of the enclosure 280 may include one or more vertical reinforcing ribs 287 as shown in FIGS. 19 and 21. The enclosure 280 may also include an upper rim 286 including a recessed lip 288 extending around an upper edge of the enclosure 280. A cover 294, seen in FIG. 18, may be provided and dimensioned to fit within upper rim 286 and rest on recessed lip 288 of the enclosure 280. The cover 294 may include orifices (not shown) corresponding to threaded holes 290 in lip 288, seen in FIGS. 17 and 20, allowing bolts (not shown) to be used to secure the cover 294 to the enclosure 280.

As described herein, one or more wheels 110 can be secured and maintained within the enclosure 280. When securing more than one wheel 110, i.e., stacked wheels 210, in the enclosure 280, the wheels 110 are in a spaced relationship from each other using one or more standoffs 218. In addition, the wheel 110 closest to the side wall, e.g., side wall 282, is in a spaced relationship from the side wall 282 using one or more standoffs 218. The wing bolt 230 passes through washer 241, the orifice 118 in the outermost wheel 110 and into the hole 223 of the standoff 218 such that the outermost wheel 110 is secured in standoff 218. According to the exemplary embodiment as shown in FIGS. 17-21, the enclosure 280 includes an open bottom 292, seen in FIG. 21, through which underground utility equipment and/or components, e.g., fiber optic communication cable, junctions, terminations, etc., may enter the enclosure 280.

Accordingly, in addition to providing protection for the cables on the stacked wheels 210, the enclosure 280 may be utilized for providing a safe secure environment for communication components including underground cables, switches, junctions, etc. It will be appreciated that the bottom 292 of the enclosure may also be a closed bottom or a partially open bottom.

According to the exemplary embodiments, each of the wheels 110 is connected to a standoff 218 at one point. Accordingly, the wheels 110 can be easily rotatable for removing and/or adding lengths of cables to the wheels 110 without having to remove the wheels 110 from the stack 210. Furthermore, the standoffs 118 provide a gap between adjacent wheels 110 and the side wall of the enclosure 280. A user thus has easy access to the lengths of the cable stored on each of the wheels 110. Since the wheels 110 of cables can be mounted to the inner side wall of the enclosure 280, the cables remain off the ground and out of the elements. Since multiple wheels 110 are capable of being conveniently stacked and stored within the enclosure 280, multiple cable sizes can be provided in a safe secure environment at one location.

The wheels 110, standoffs 218, wing bolts 230, mounting plates 240 and 240A, enclosure 280, etc. as described herein, may be made from any one or more suitable materials having sufficient rigidity and strength to support the cable in the desired application. These materials may include plastics, concrete including resin based polyconcrete, polymer concrete, etc. steel including stainless steel and galvanized steel, aluminum and aluminum alloys, etc.

It will be understood that various modifications can be made to the embodiments of the present disclosure without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. A utility enclosure that can store fiber optic cables, the utility enclosure comprising:
    an underground enclosure having a side wall and a base wall; and
    a cable storage system mountable to the side wall or the base wall of the enclosure, the cable storage system comprising:
        at least a first cable storage member for storing at least one of the fiber optic cables and a second cable storage member for storing at least one of the fiber optic cables, each cable storage member having a hub, a plurality of spaced apart rims and a floor extending between an outer wall of the hub and an inner wall of each rim so as to define an open holding channel for holding the at least one of the fiber optic cables;
        at least one mounting plate coupled to the side wall or the base wall of the enclosure, the at least one mounting plate is used to secure the first cable storage member to the side wall or the base wall of the enclosure; and
        at least a first spacer and a second spacer, the first spacer having a first end secured to the mounting plate and a second end secured to the first cable storage member for maintaining a gap between the first cable storage member and the side wall or the base wall of the enclosure, and the second spacer having a first end secured to the first cable storage member and a second end secured to the second cable storage member such that the second spacer is disposed between the first and second cable storage members to maintain a gap between the first cable storage member and second cable storage member.

2. The utility enclosure according to claim 1, wherein each cable storage member comprises a cable storage wheel.

3. The utility enclosure according to claim 1, wherein the enclosure comprises one of a utility box and a utility vault.

4. The utility enclosure according to claim 1, wherein the first spacer is removably mounted to the at least one mounting plate.

5. The utility enclosure according to claim 1, wherein each cable storage member is dimensioned for holding the at least one of the fiber optic cables without violating a minimum bending radius threshold of the at least one of the fiber optic cables.

6. The utility enclosure according to claim 1, further comprising a lid for covering the enclosure.

7. An underground cable storage utility enclosure comprising:
    an underground enclosure;
    a plurality of circular cable storage members, wherein a first of the plurality of cable storage members is secured to a wall of the enclosure for holding fiber optic cable, each cable storage member having a hub, a plurality of spaced apart rims and a floor extending between an outer wall of the hub and an inner wall of each rim so as to define an open holding channel for holding the fiber optic cable; and
    a plurality of spacers, wherein a first of the plurality of spacers has a first end secured to the wall of the enclosure and a second end secured to the first cable storage member so as to maintain a gap between the first cable storage member and the wall of the enclosure, and wherein each subsequent spacer has a first end secured to the previous cable storage member and a second end secured to the next in line cable storage member such that each subsequent spacer is disposed between the previous cable storage member and the next in line cable storage member so as to maintain a gap between the previous cable storage member and the next in line cable storage member.

8. The underground cable storage utility enclosure according to claim 7, wherein the enclosure comprises one of a utility box and a utility vault.

9. The underground cable storage utility enclosure according to claim 7, further comprising a mounting plate attachable to a wall of the enclosure.

10. The underground cable storage utility enclosure according to claim 9, wherein the first of the plurality of spacers is mounted to the mounting plate.

11. The underground cable storage utility enclosure according to claim 10, wherein the first of the plurality of spacers mounted to the mounting plate is removably mounted to the mounting plate.

12. The underground cable storage utility enclosure according to claim 9, wherein the first of the plurality of spacers mounted to the mounting plate comprises a threaded stud, and wherein the mounting plate comprises a threaded orifice for receiving the threaded stud.

13. The underground cable storage utility enclosure according to claim 7, wherein each of the circular cable storing members comprises a cable storage wheel dimensioned for holding a fiber optic cable without violating a minimum bending radius threshold of the fiber optic cable.

14. The underground cable storage utility enclosure according to claim 7, further comprising a lid for covering the enclosure.

\* \* \* \* \*